United States Patent
Lin et al.

(10) Patent No.: US 12,348,129 B2
(45) Date of Patent: Jul. 1, 2025

(54) BOOST POWER SUPPLY CIRCUIT

(71) Applicant: LITE-ON TECHNOLOGY CORPORATION, Taipei (TW)

(72) Inventors: Yu-Cheng Lin, Taipei (TW); Te-Hung Yu, Taipei (TW); Chia-Hui Liang, Taipei (TW); Min-Hao Hsu, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 231 days.

(21) Appl. No.: 18/117,477

(22) Filed: Mar. 6, 2023

(65) Prior Publication Data
US 2024/0162809 A1    May 16, 2024

(30) Foreign Application Priority Data

Nov. 15, 2022  (CN) .......................... 202211428315.7

(51) Int. Cl.
*H02M 1/42* (2007.01)

(52) U.S. Cl.
CPC ................................ *H02M 1/4208* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247;
(Continued)

(56) References Cited

U.S. PATENT DOCUMENTS

| | | | | |
|---|---|---|---|---|
| 5,923,152 A | * | 7/1999 | Guerrera | H02M 3/158 363/127 |
| 9,431,840 B2 | * | 8/2016 | Lee | H02M 3/1582 |

(Continued)

FOREIGN PATENT DOCUMENTS

| TW | 201021380 A | 6/2010 |
|---|---|---|
| TW | 202228371 A | 7/2022 |

OTHER PUBLICATIONS

Taiwan Office Action corresponding to Application No. 111143524 and issued on Jun. 5, 2023, 8 pages.

*Primary Examiner* — Jeffrey A Gblende
(74) *Attorney, Agent, or Firm* — Innovation Counsel LLP

(57) ABSTRACT

A power supply circuit is provided. The power factor correction (PFC) circuit is used to perform a power factor correction according to a first voltage to generate an intermediate voltage. The first storage capacitor is used to store a first electrical energy related to the intermediate voltage. The boost conversion circuit is connected to the PFC circuit and used to generate an output voltage according to the intermediate voltage. The boost conversion circuit includes a first post-stage inductor, a first post-stage diode and a first post-stage transistor. The second storage capacitor is used to store a second electrical energy related to the output voltage. The capacitance value of the second storage capacitor is less than the capacitance value of the first storage capacitor; the first electrical energy is completely or partially transferred as the second electrical energy.

4 Claims, 22 Drawing Sheets

(58) Field of Classification Search
CPC .......... G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069

See application file for complete search history.

(56) References Cited

U.S. PATENT DOCUMENTS

| | | | |
|---|---|---|---|
| 9,614,432 B2* | 4/2017 | Takata | ................ H02M 1/4225 |
| 2017/0163149 A1* | 6/2017 | Takata | ................ H05B 45/375 |

* cited by examiner

BOOST POWER SUPPLY CIRCUIT

This application claims the benefit of People's Republic of China application Serial No. 202211428315.7, filed Nov. 15, 2022, the subject matter of which is incorporated herein by reference.

BACKGROUND OF THE INVENTION

Field of the Invention

The disclosure is related to a power supply circuit, and more particularly, related to a power supply circuit capable of increasing the holdup time of electrical energy.

Description of the Related Art

FIG. 1 is a circuit diagram of a power supply circuit 10 in a prior art. As shown in FIG. 1, the power supply circuit 10 includes a filter 30, a power factor correction (PFC) circuit 40, a capacitor C_bk and a DC-DC conversion circuit 50. The power supply circuit 10 receives an input voltage Vin1 and further converts the received input voltage Vin1 into an output voltage Vout. The output voltage Vout, such as, in the form of differential voltage, has a positive output potential Vout (+) and a negative output potential Vout (−).

The PFC circuit 40 includes a bridge circuit composed of 4 diodes D1~D4, an inductor L_pf, a transistor Q_pf and a diode D_pf. The PFC circuit is used to adjust the phase difference between the input voltage Vin1 and its corresponding input current (not illustrated in the diagram), so that the electrical energy generated by the input voltage Vin1 and its corresponding input current may have a larger power value. The electrical energy may be stored in the capacitor C_bk for the DC-DC conversion circuit 50 to generate an output voltage Vout. The conventional DC-DC conversion circuit 50 is usually realized by a boost conversion circuit.

A better power supply circuit 10 possesses the qualities of high power conversion efficiency, high power density and sufficient holdup time of electrical energy. However, the inductor L_pf of the PFC circuit 40 usually has a larger size, and so does the capacitor C_bk for storing an electrical energy. Large-sized inductor L_pf and capacitor C_bk limit the power density of the power supply circuit 10. Moreover, the voltage drop of the diodes D1~D4 of the bridge circuit also limits the conversion efficiency of the power supply circuit 10.

Therefore, skilled ones of the technical field are devoted to improve the PFC circuit and the boost conversion circuit of the power supply circuit with a goal of reducing size and hardware cost without reducing the holdup time of electrical energy, and increasing the conversion efficiency and power density of the power supply circuit.

SUMMARY OF THE INVENTION

According to one embodiment of the present invention, a power supply circuit is provided. The power supply circuit includes a power factor correction (PFC) circuit, a first storage capacitor, and a boost conversion circuit. The PFC circuit is used to perform a power factor correction according to a first voltage to generate an intermediate voltage. The first storage capacitor is used to store a first electrical energy related to the intermediate voltage. The boost conversion circuit is connected to the PFC circuit and is used to generate an output voltage according to the intermediate voltage. The boost conversion circuit includes a first post-stage inductor, a first post-stage diode and a first post-stage transistor. The first post-stage inductor is connected to the first storage capacitor. The first post-stage diode is connected to the first post-stage inductor. The first post-stage transistor is connected to the first post-stage inductor and the first post-stage diode. The second storage capacitor is connected to the first post-stage diode and is used to store the second electrical energy related to the output voltage. The capacitance value of the second storage capacitor is less than the capacitance value of the first storage capacitor; the first electrical energy is completely or partially transferred as the second electrical energy.

The above and other aspects of the invention will become better understood with regard to the following detailed description of the preferred but non-limiting embodiment (s). The following description is made with reference to the accompanying drawings.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art may selectively implement or combine some or all of the technical features of any embodiment of the present disclosure.

Figure 1:
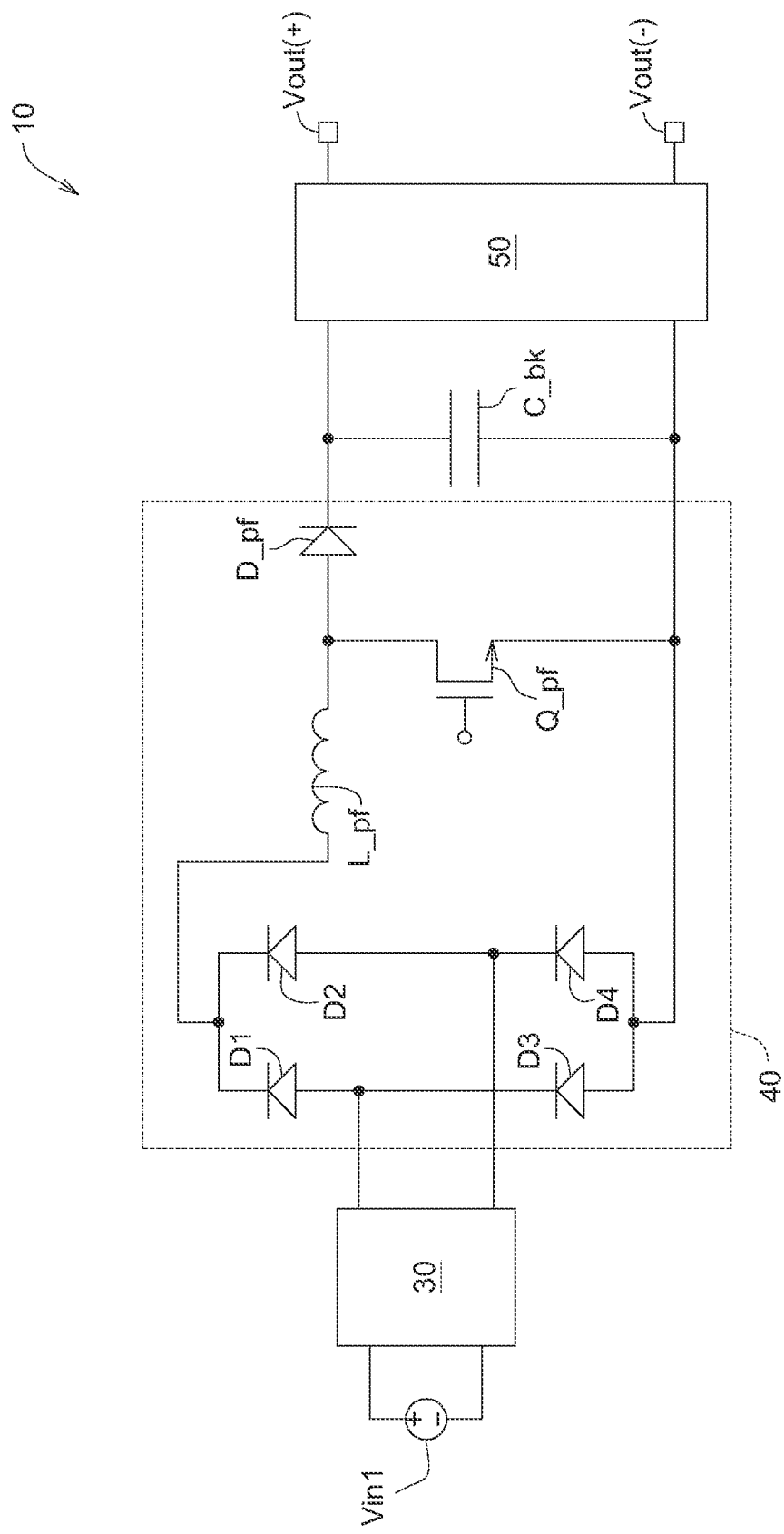
FIG. 1 (PRIOR ART) is a circuit diagram of a power supply circuit 10 in a prior art.
Figure 2A:
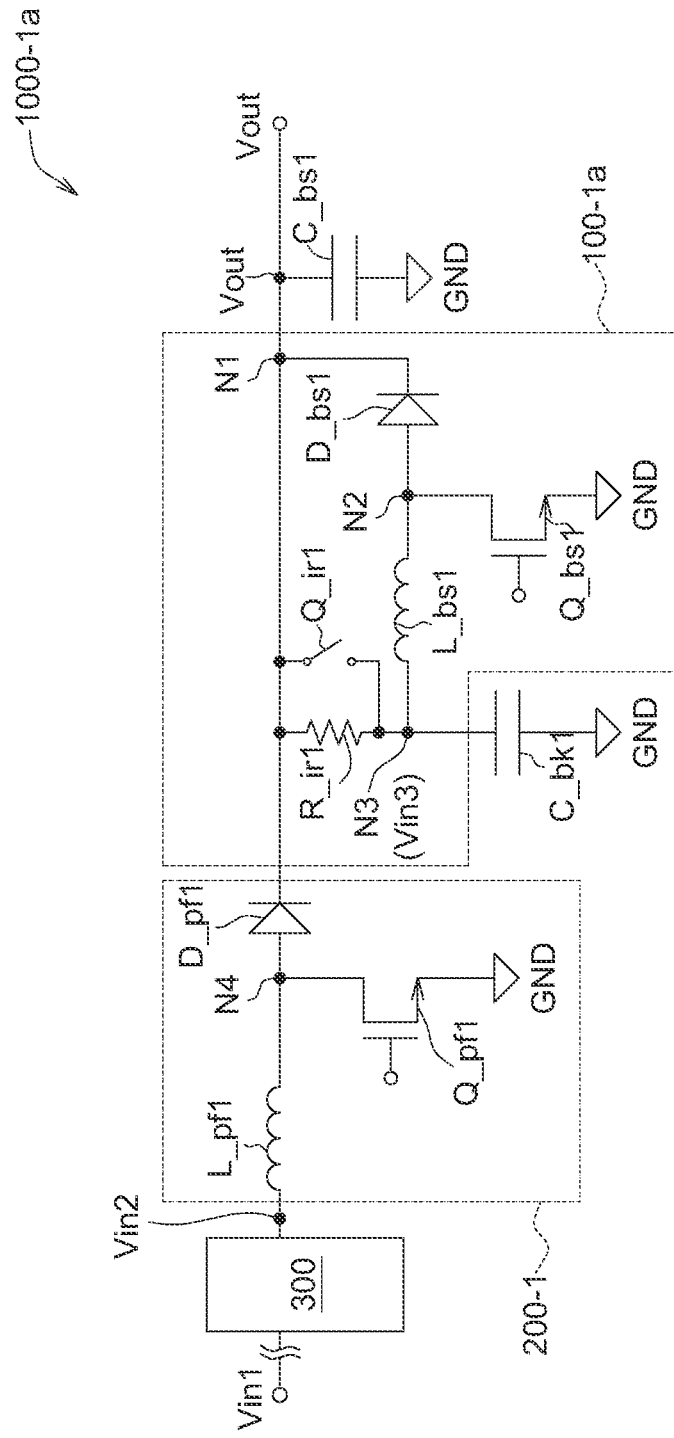
FIG. 2A is a circuit diagram of a power supply circuit 1000-1a according to a first embodiment of the present disclosure.

FIG. 2A is a circuit diagram of a power supply circuit 1000-1a according to a first embodiment of the present disclosure. As shown in FIG. 2A, the power supply circuit 1000-1a includes a boost conversion circuit 100-1a, a power factor correction (PFC) circuit 200-1 and a front-stage circuit 300.

The front-stage circuit 300 receives a first voltage Vin1, which is an input voltage in the form of alternating current (AC) voltage. The front-stage circuit 300 includes a filter and a bridge circuit (not illustrated in the diagram). The filter is used to filter electromagnetic interference (EMI) off the first voltage Vin1, and the bridge circuit is used to regulate the first voltage Vin1 to obtain a second voltage Vin2, which is in the form of a direct current (DC) voltage.

The PFC circuit 200-1 is connected to the front-stage circuit 300.

The input end of the PFC circuit 200-1 receives a second voltage Vin2. The PFC circuit 200-1 performs power factor correction to the second voltage Vin2 and its corresponding current (not illustrated in the diagram). The PFC circuit 200-1 includes an inductor L_pf1, a diode D_pf1 and a transistor Q_pf1. The inductor L_pf1 is connected to the diode D_pf1 in series, and one end of the inductor L_pf1 is connected to the input end of the PFC circuit 200-1 to receive the second voltage Vin2, and the other end of the inductor L_pf1 is connected to the anode of the diode D_pf1. In the present embodiment, the other end of the inductor L_pf1 and the anode of the diode D_pf1 both are connected to the node N4, and the drain of the transistor Q_pf1 is connected to the node N4. The transistor Q_pf1 may be realized by an NMOS transistor; the source of the transistor Q_pf1 is connected to the ground end GND.

The capacitor C_bk1 may also be referred as "first storage capacitor". The capacitor C_bk1 is disposed between the PFC circuit 200-1 and the boost conversion circuit 100-1a. One end of the capacitor C_bk1 is connected to the node N3, and the other end of the capacitor C_bk1 is connected to the ground end GND. In operation, the capacitor C_bk1 is used to store an electrical energy. When the supply of the first voltage Vin1 stops, the electrical energy E1 stored in the capacitor C_bk1 may be supplied to the devices at the post-stage. The potential at one end of the capacitor C_bk1 connected to the node N3 is equivalent to a third voltage Vin3, which may also be referred as "intermediate voltage". The PFC circuit 200-1 performs a power factor correction according to the first voltage Vin1 to generate the third voltage Vin3. The electrical energy E1 stored in the capacitor C_bk1 may be calculated according to formula (1) (note: the symbol "C_bk1" also represents a capacitance value of the "capacitor C_bk1"):

$$E1 = \frac{C\_bk1 \times (Vin3)^2}{2} \quad (1)$$

Moreover, the transistor Q_pf1 may be used as a switch. In the present embodiment, since the transistor Q_pf1 has a lower switching speed, the third voltage Vin3 may cause a larger ripple. The capacitor C_bk1 with a larger capacitance value may be selected to control the ripple of the third voltage Vin3. Also, the selection of small-sized inductor L_pf1 and capacitor C_bk1 helps to increase power density. When the size of the capacitor C_bk1 is reduced (that is, the capacitance value of the capacitor C_bk1 decreases), the holdup time of electrical energy of the power supply circuit 1000-1a (such as the holdup time of the electrical energy E1 stored in the capacitor C_bk1) will decrease accordingly.

The boost conversion circuit 100-1a is connected to the PFC circuit 200-1 and the capacitor C_bk1 to convert the third voltage Vin3 at one end of the capacitor C_bk1 (that is, the third voltage Vin3 of the node N3) into an output voltage Vout. The potential at the node N1 of the boost conversion circuit 100-1a is equivalent to the output voltage Vout. The boost conversion circuit 100-1a includes a resistor R_ir1, a switch Q_ir1, an inductor L_bs1, a diode D_bs1 and a transistor Q_bs1.

In the boost conversion circuit 100-1a of the present embodiment, the resistor R_ir1 is connected in parallel with the switch Q_ir1, which may be realized by an NMOS transistor (not illustrated in the diagram). One end of the resistor R_ir1 and one end of the switch Q_ir1 both are connected to the node N1. The other end of the resistor R_ir1 and the other end of the switch Q_ir1 both are connected to the node N3. That is, the other end of the resistor R_ir1 and the other end of the switch Q_ir1 both are connected to one end of the capacitor C_bk1. In operation, the resistor R_ir1 and the switch Q_ir1 are used to suppress the inrush current which may possibly be generated by the PFC circuit 200-1. When the current value of the current of the PFC circuit 200-1 is too large, this indicates a possible generation of the inrush current. Thus, the switch Q_ir1 is in a turned-off state to suppress the inrush current. In other embodiments, when the resistor R_ir1 and the switch Q_ir1 are dispensed with, the potential at the node N3 is equivalent to the potential at the node N1 and is also equivalent to the third voltage Vin3 (that is, "the intermediate voltage" generated by the PFC circuit 200-1).

On the other hand, the inductor L_bs1 is connected in series with the diode D_bs1. One end of the inductor L_bs1 is connected to the node N3; the other end of the inductor L_bs1 and the anode of the diode D_bs1 both are connected to the node N2; the cathode of the diode D_bs1 is connected to the node N1. The drain of the transistor Q_bs1 is connected to the node N2; the source of the transistor Q_bs1 is connected to the ground end GND.

The capacitor C_bs1 may also be referred as "second storage capacitor". One end of the capacitor C_bs1 is connected to the node N1 of the boost conversion circuit 100-1a; the other end of the capacitor C_bs1 is connected to the ground end GND. The inductor L_bs1 and the diode D_bs1 of the boost conversion circuit 100-1a are disposed between the capacitor C_bs1 and the capacitor C_bk1. The potential at one end of the capacitor C_bs1 connected to the node N1 is the output voltage Vout; the electrical energy E2 stored in the capacitor C_bs1 may be calculated according to formula (2) (note: the symbol "C_bs1" also represents the capacitance value of the "capacitor C_bs1"):

$$E2 = \frac{C\_bs1 \times (Vout)^2}{2} \quad (2)$$

The transistor Q_bs1 may be used as a switch. In the present embodiment, the transistor Q_bs1 may be realized by a power transistor. Since the transistor Q_bs1 has a higher switching speed, the output voltage Vout may cause a smaller ripple. Thus, the capacitor C_bs1 with a small capacitance will be able to control the ripple of the output voltage Vout. The capacitance value of the capacitor C_bs1 is far smaller than the capacitance value of the capacitor C_bk1. For instance, the ratio of the capacitance value of the capacitor C_bs1 to the capacitance value of the capacitor C_bk1 is 1:100. The output voltage Vout is about 400V. Thus, the selected inductor L_bs1 and capacitor C_bs1 may have a small size. The energy E1 stored in the capacitor C_bk1 may be completely or partially transferred to the energy E2 stored in the capacitor C_bs1. Since the energy E1 stored in the capacitor C_bk1 may be transferred to the capacitor C_bs1, the capacitor C_bk1 with a smaller capacitance value may be selected without affecting the holdup time of electrical energy of the power supply circuit 1000-1a. Through the use of the boost conversion circuit 100-1a, the size of the capacitor C_bk1 may be greatly reduced (in an exemplary example, the size of the capacitor C_bk1 may be reduced by 50%). When the capacitor C_bk1 is downsized, the hardware cost of the power supply circuit 1000-1a may be reduced, and the power density of the power supply circuit 1000-1a may be increased.

In operation, when the supply of the first voltage Vin1 is normal, the power supply circuit 1000-1a operates in a first mode, which may also be referred as "input source nominal mode". On the other hand, when the supply of the first voltage Vin1 stops, the power supply circuit 1000-1a operates in the second mode, and the second mode may also be referred as "input source failure mode". In the second mode, the transistor Q_bs1 of the boost conversion circuit 100-1a operates in a boost mode to transfer the electrical energy E1 stored in the capacitor C_bk1 to the capacitor C_bs1. Moreover, the diode D_bs1 of the boost conversion circuit 100-1a regulates the output voltage Vout at one end of the capacitor C_bs1, so that the output voltage Vout may remain at the level with which the power supply circuit 1000-1a may operate in the first mode.

Figure 2B:
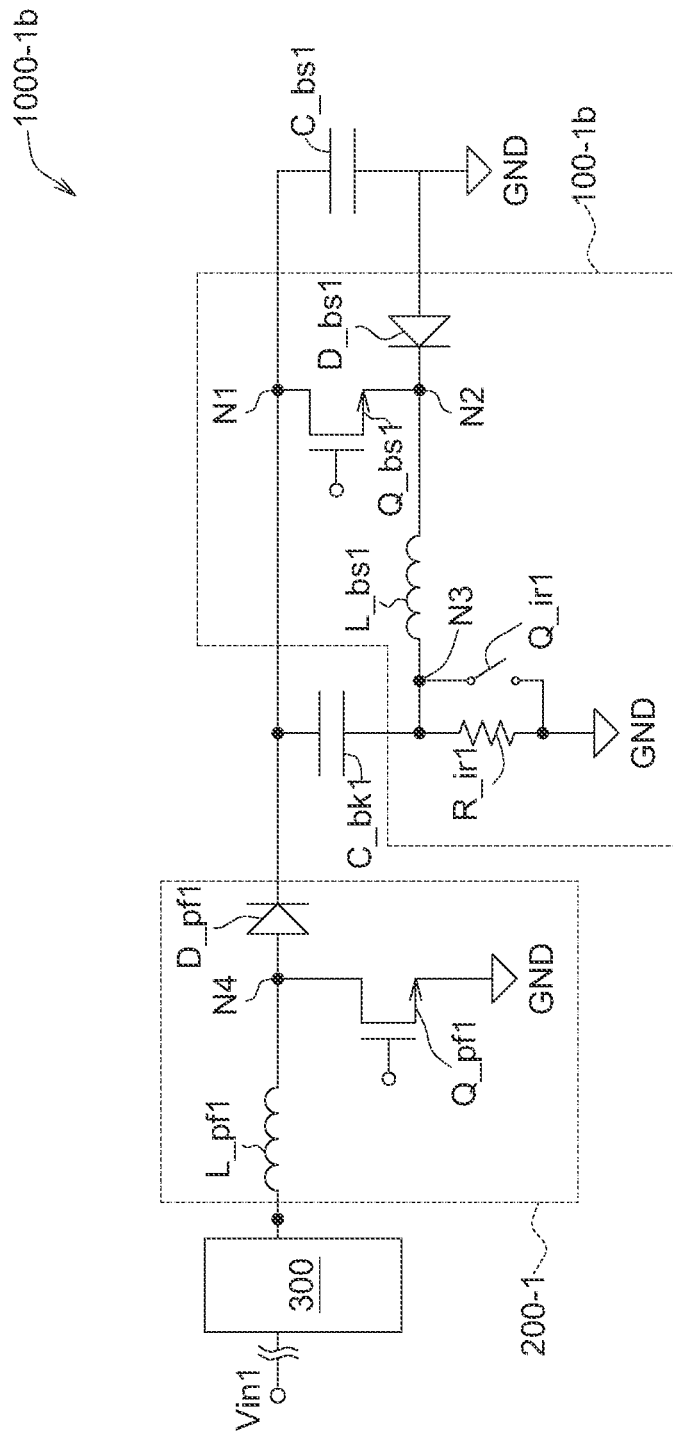
FIG. 2B is a circuit diagram of a power supply circuit 1000-1b according to a second embodiment of the present disclosure.

FIG. 2B is a circuit diagram of a power supply circuit 1000-1b according to a second embodiment of the present disclosure. The power supply circuit 1000-1b of FIG. 2B is similar to the power supply circuit 1000-1a of FIG. 2A, different in that the connection of the capacitor C_bk1 of the power supply circuit 1000-1b of FIG. 2B is different from the connection of each element of the boost conversion circuit 100-1b.

As shown in FIG. 2B, the capacitor C_bk1 is connected between the node N1 and the node N3, and one end of the capacitor C_bk1 is connected to the cathode of the diode D_pf1. The cathode of the diode D_pf1 is the output end of the PFC circuit 200-1. On the other hand, in the boost conversion circuit 100-1, the resistor R_ir1 and the switch Q_ir1 used to suppress the inrush current are connected between the node N3 and the ground end GND. The transistor Q_bs1 used to control the energy transfer of the capacitor C_bk1 is connected between the node N1 and the node N2; the drain of the transistor Q_bs1 is connected to the capacitor C_bs1.

Unlike the capacitor C_bk1 and the transistor Q_bs1 of FIG. 2A, which are both connected to the ground end GND, the capacitor C_bk1 and the transistor Q_bs1 of FIG. 2B are not connected to the ground end GND, but are connected to the node N1 and then are connected to the capacitor C_bs1.

Figure 2C:
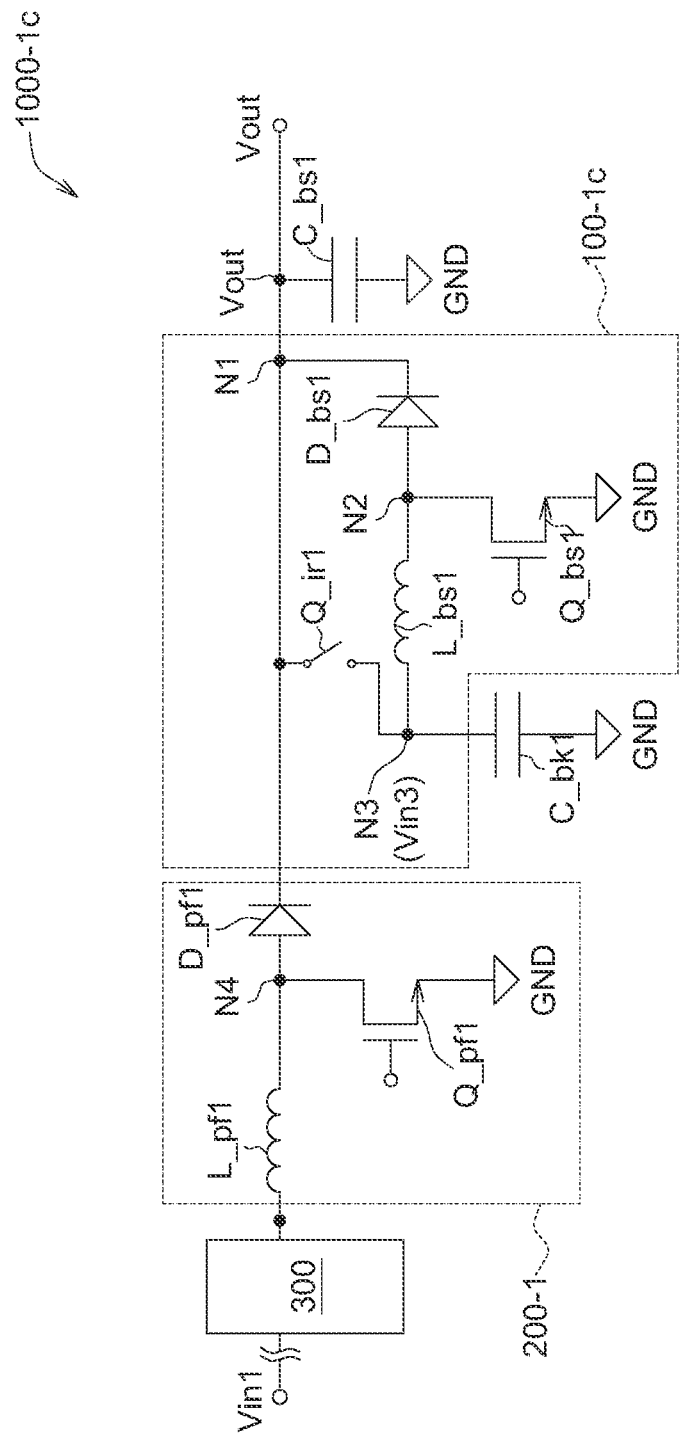
FIG. 2C is a circuit diagram of a power supply circuit 1000-1c according to a third embodiment of the present disclosure.

FIG. 2C is a circuit diagram of a power supply circuit 1000-1c according to a third embodiment of the present disclosure. The power supply circuit 1000-1c of FIG. 2C is similar to the power supply circuit 1000-1a of FIG. 2A, but is different in that the boost conversion circuit 100-1c of the power supply circuit 1000-1c of FIG. 2C does not include the resistor R_ir1. That is, the boost conversion circuit 100-1c of FIG. 2C may suppress the inrush current using the switch Q_ir1 only. Through the "soft-start control" mechanism, inrush current suppression may be performed by the boost conversion circuit 100-1c using software, therefore the resistor R_ir1 may be dispensed with.

Figure 2D:
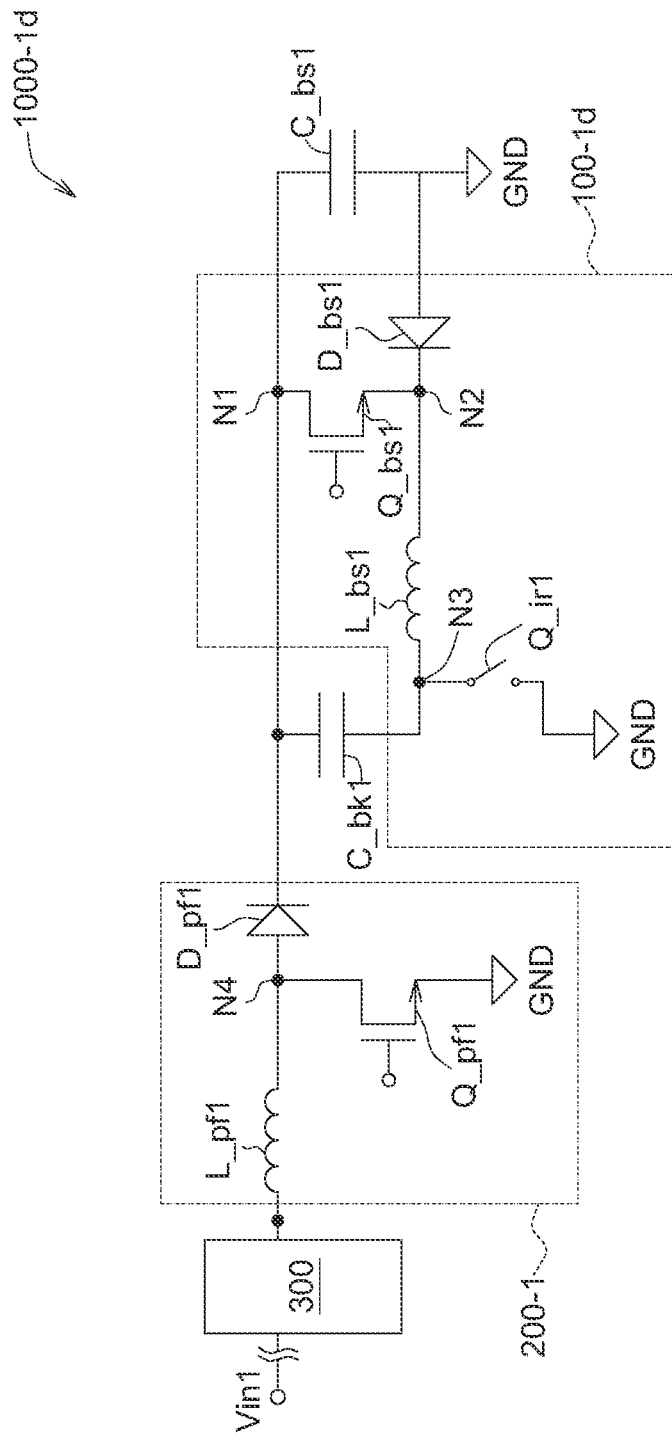
FIG. 2D is a circuit diagram of a power supply circuit 1000-1d according to a fourth embodiment of the present disclosure.

FIG. 2D is a circuit diagram of a power supply circuit 1000-1d according to a fourth embodiment of the present disclosure. The power supply circuit 1000-1d of the embodiment of FIG. 2D is similar to the power supply circuit 1000-1b of the embodiment of FIG. 2B, but is different in that the boost conversion circuit 100-1d of FIG. 2D does not include the resistor R_ir1. Through the soft-start control mechanism, inrush current suppression may be performed, therefore the resistor R_ir1 may be dispensed with.

Figure 2E:
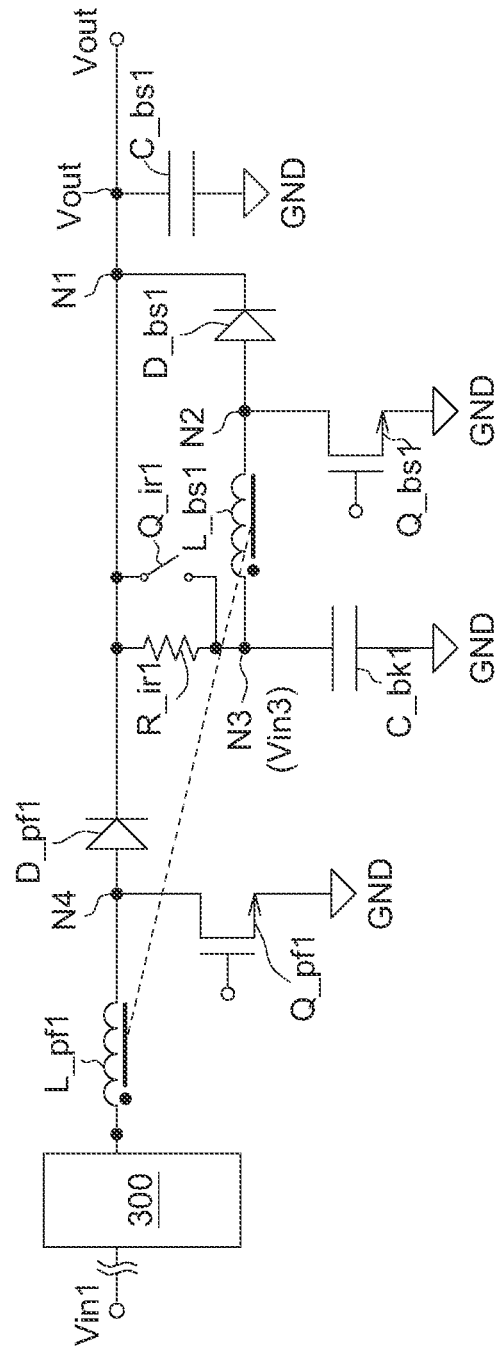
FIG. 2E is a circuit diagram of a power supply circuit 1000-1e according to a fifth embodiment of the present disclosure.

FIG. 2E is a circuit diagram of a power supply circuit 1000-1e according to a fifth embodiment of the present disclosure. The embodiment of FIG. 2E is similar to the embodiment of FIG. 2A, but is different in that, in the embodiment of FIG. 2E, the inductor L_bs1 is coupled to the inductor L_pf1 through the coupling inductance mechanism, and the inductor L_bs1 and the inductor L_pf1 use the same magnetic core.

Figure 2F:
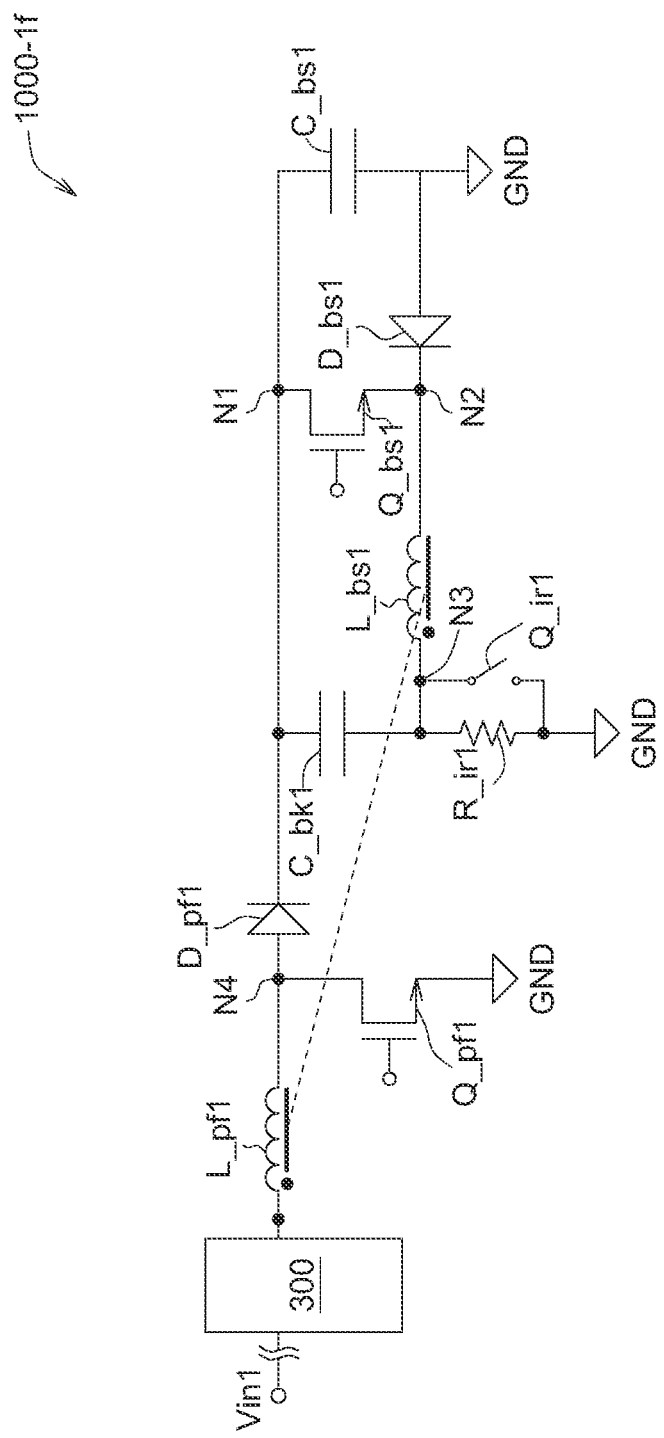
FIG. 2F is a circuit diagram of a power supply circuit 1000-1f according to a sixth embodiment of the present disclosure.

FIG. 2F is a circuit diagram of a power supply circuit 1000-1f according to a sixth embodiment of the present disclosure. The embodiment of FIG. 2F is similar to the embodiment of FIG. 2B, but is different in that in the embodiment of FIG. 2F, the inductor L_bs1 is coupled to the inductor L_pf1 through the coupling inductance mechanism.

Figure 3A:
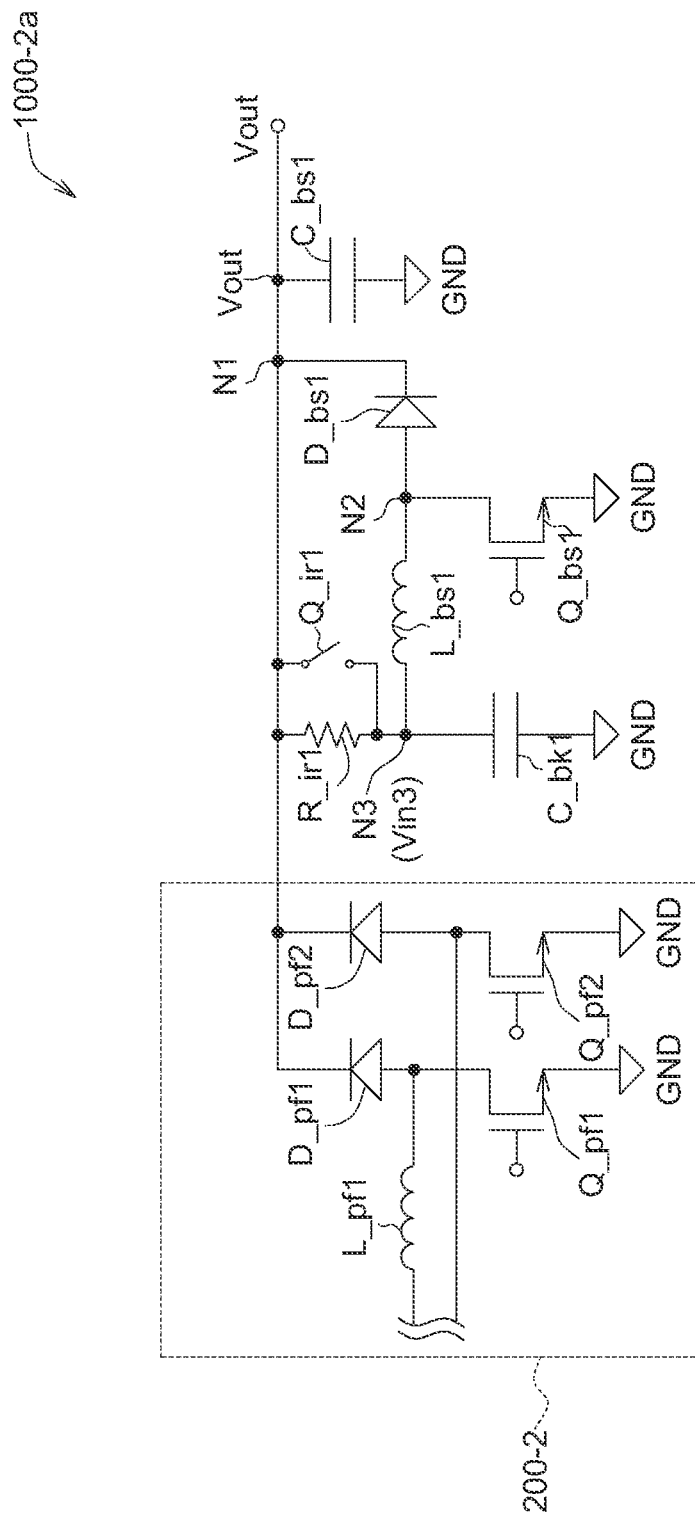
FIG. 3A is a circuit diagram of a power supply circuit 1000-2a according to a seventh embodiment of the present disclosure.

FIG. 3A is a circuit diagram of a power supply circuit 1000-2a according to a seventh embodiment of the present disclosure. The embodiment of FIG. 3A is similar to the embodiment of FIG. 2A, but is different in that the PFC circuit 200-2 of the power supply circuit 1000-2a of FIG. 3A has a different configuration. The PFC circuit 200-2 includes 2 diodes and 2 transistors, namely, diode D_pf1, diode D_pf2, transistor Q_pf1, and transistor Q_pf2. The connection of each element of the PFC circuit 200-2 is as follows. The cathode of the diode D_pf1 and the cathode of the diode D_pf2 are connected to the resistor R_ir1 and the switch Q_ir1. The cathode of the diode D_pf1 and the cathode of the diode D_pf2 are connected to the capacitor C_bk1 through the resistor R_ir1. That is, the cathode of the diode D_pf1 and the cathode of the diode D_pf2 are indirectly connected to the capacitor C_bk1. Moreover, the anode of the diode D_pf1 and the anode of the diode D_pf2 respectively are connected to the drain of the transistor Q_pf1 and the drain of the transistor Q_pf2. The anode of the diode D_pf1 and the drain of the transistor Q_pf1 are connected to the inductor L_pf1.

Figure 3B:
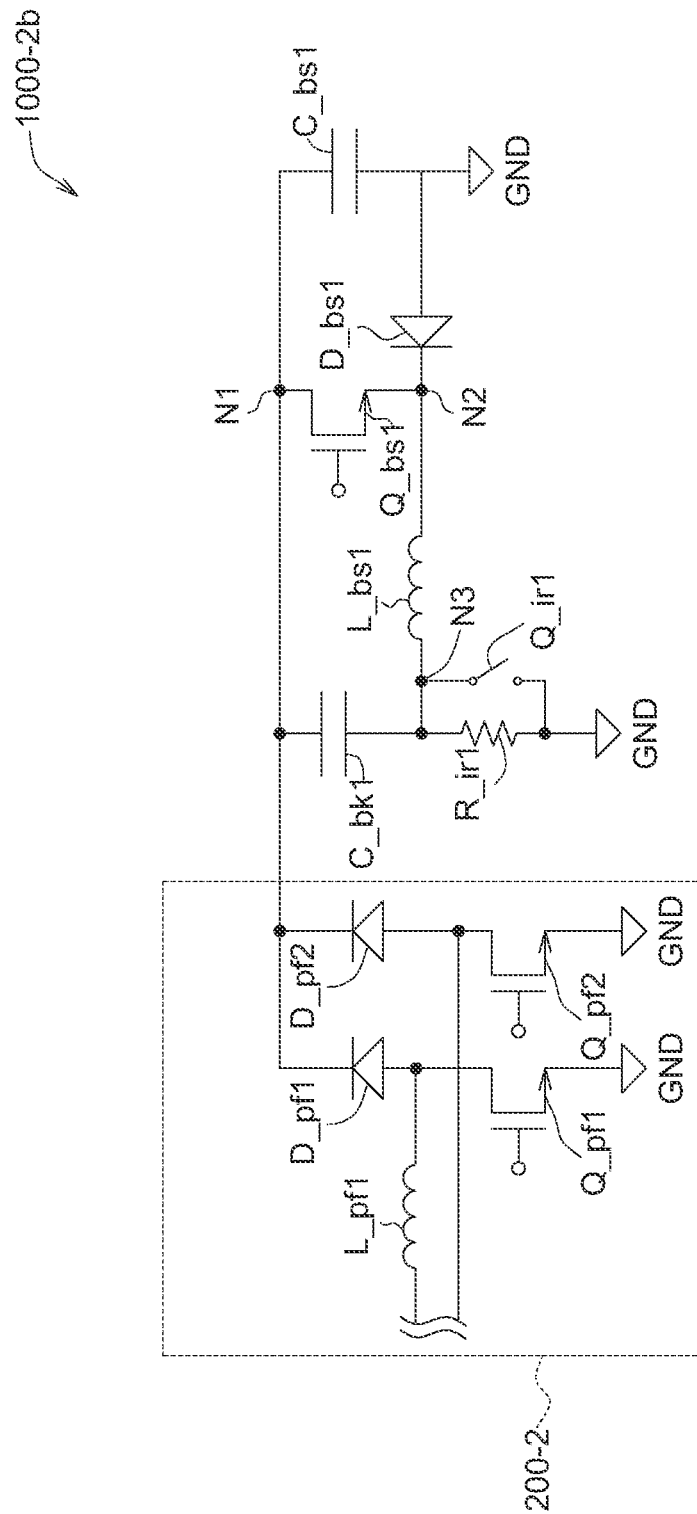
FIG. 3B is a circuit diagram of a power supply circuit 1000-2b according to an eighth embodiment of the present disclosure.

FIG. 3B is a circuit diagram of a power supply circuit 1000-2b according to an eighth embodiment of the present disclosure. The embodiment of FIG. 3B is similar to the embodiment of FIG. 2B, but is different in that the PFC circuit 200-2 of FIG. 3B is different from the PFC circuit 200-1 of FIG. 2B but is identical to the power supply circuit 1000-2a of FIG. 3A. On the other hand, in the power supply circuit 1000-2b of FIG. 3B, the cathode of the diode D_pf1 and the cathode of the diode D_pf2 are directly connected to the capacitor C_bk1.

In the embodiments of FIGS. 3A and 3B, inrush current suppression may also be performed through the soft-start control mechanism, therefore the resistor R_ir1 may be dispensed with. On the other hand, through the coupling inductance mechanism, the inductor L_bs1 of FIGS. 3A and 3B may be coupled to the inductor L_pf1, and the inductor L_bs1 and the inductor L_pf1 use the same magnetic core.

Figure 4A:
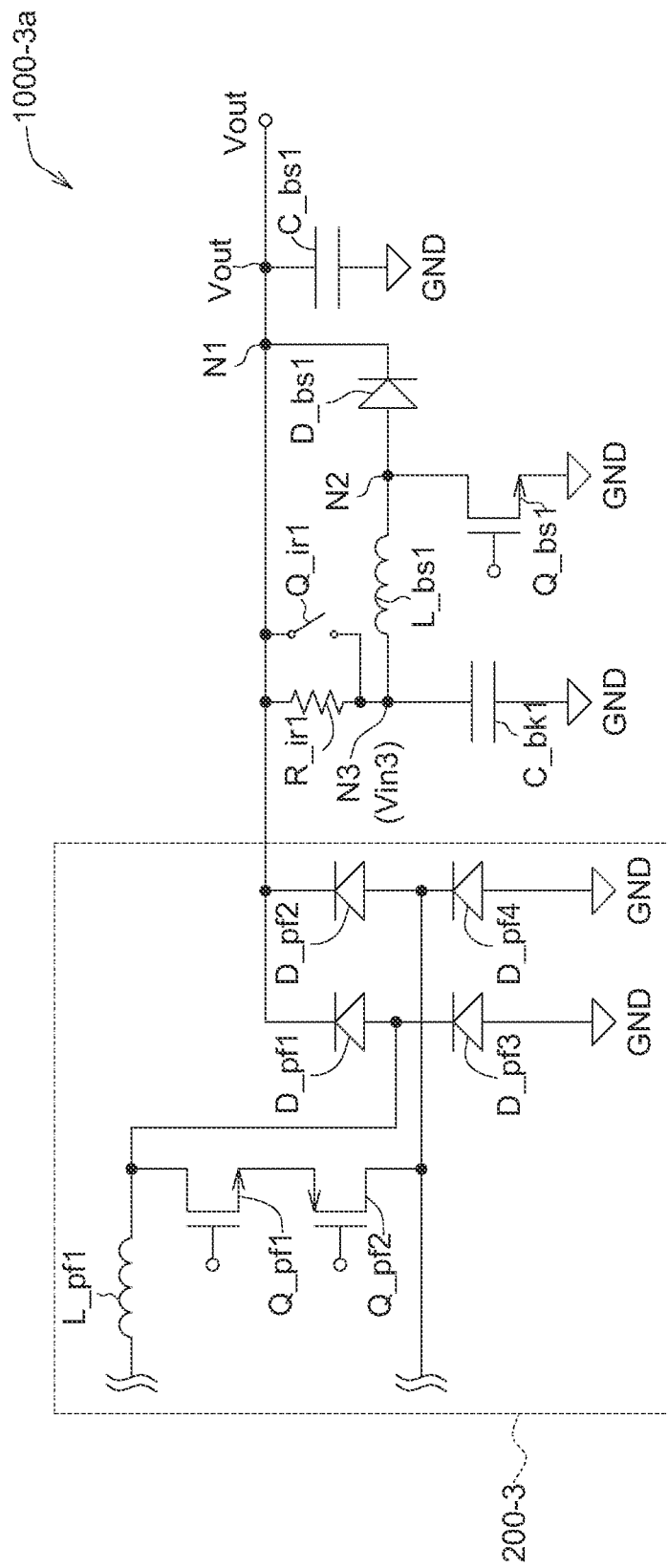
FIGS. 4A and 4B respectively are circuit diagrams of power supply circuits 1000-3a and 1000-3b according to nineth and tenth embodiments of the present disclosure.
Figure 4B:
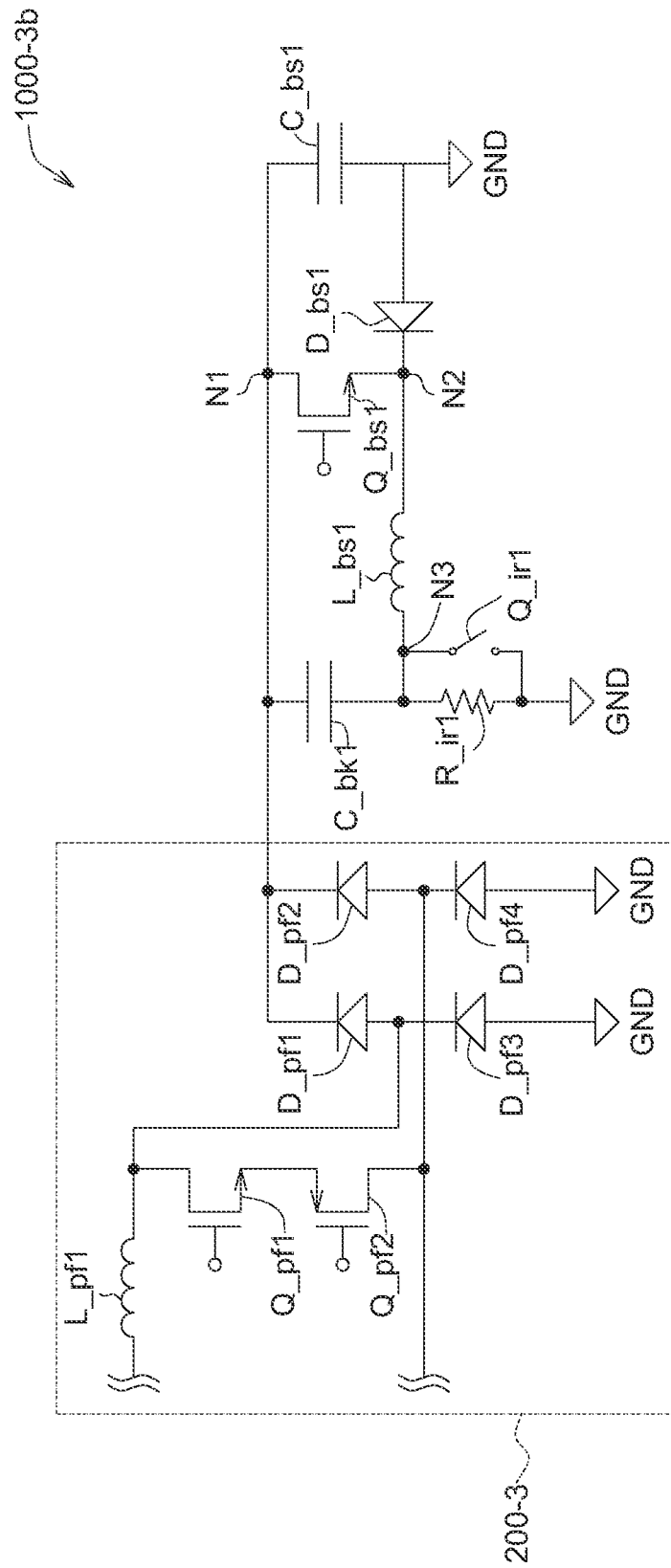

FIGS. 4A and 4B respectively are circuit diagrams of power supply circuits 1000-3a and 1000-3b according to nineth and tenth embodiments of the present disclosure. The embodiments of FIGS. 4A and 4B respectively are similar to the embodiments of FIGS. 3A and 3B, but are different in that the PFC circuit 200-3 of the power supply circuits 1000-3a and 1000-3b of FIGS. 4A and 4B has a different configuration. The PFC circuit 200-3 of FIGS. 4A and 4B includes 4 diodes and 2 transistors, namely, diodes D_pf1~D_pf4, transistor Q_pf1 and transistor Q_pf2. Connection of each of the abovementioned elements of the PFC circuit 200-3 is as follows. The anode of the diode D_pf1 and the anode of the diode D_pf2 respectively are connected to the drain of the transistor Q_pf1 and the drain of the transistor Q_pf2. Moreover, the anode of the diode D_pf1 and the anode of the diode D_pf2 respectively are connected to the cathode of the diode D_pf3 and the cathode of the diode D_pf4. The source of the transistor Q_pf1 is connected to the source of the transistor Q_pf2. The anode of the diode D_pf1 and the drain of the transistor Q_pf1 are connected to the inductor L_pf1.

Moreover, the cathode of the diode D_pf1 and the cathode of the diode D_pf2 are directly or indirectly connected to the capacitor C_bk1. In the power supply circuit 1000-3a of FIG. 4A, the cathode of the diode D_pf1 and the cathode of the diode D_pf2 are connected to the capacitor C_bk1 through the resistor R_ir1. That is, the cathode of the diode D_pf1 and the cathode of the diode D_pf2 are indirectly connected to the capacitor C_bk1. On the other hand, in the power supply circuit 1000-3b of FIG. 4B, the cathode of the diode D_pf1 and the cathode of the diode D_pf2 are directly connected to the capacitor C_bk1. Besides, inrush current suppression may be performed through the soft-start control mechanism, therefore the resistor R_ir1 may be dispensed with. Moreover, the inductor L_bs1 is coupled to the inductor L_pf1 through the coupling inductance mechanism, and the inductor L_bs1 and the inductor L_pf1 use the same magnetic core.

Figure 5A:
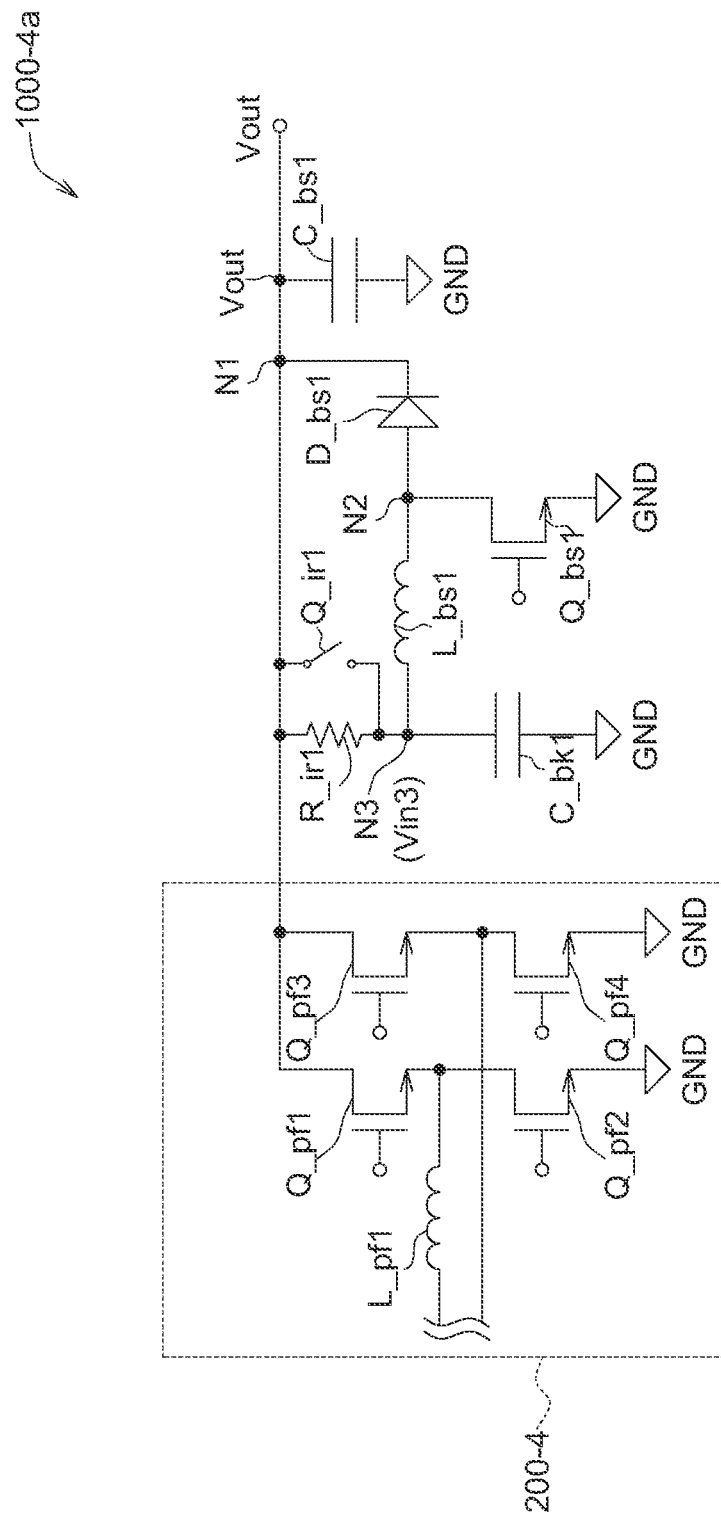
FIGS. 5A and 5B respectively are circuit diagrams of power supply circuits 1000-4a and 1000-4b according to eleventh and twelfth embodiments of the present disclosure.
Figure 5B:
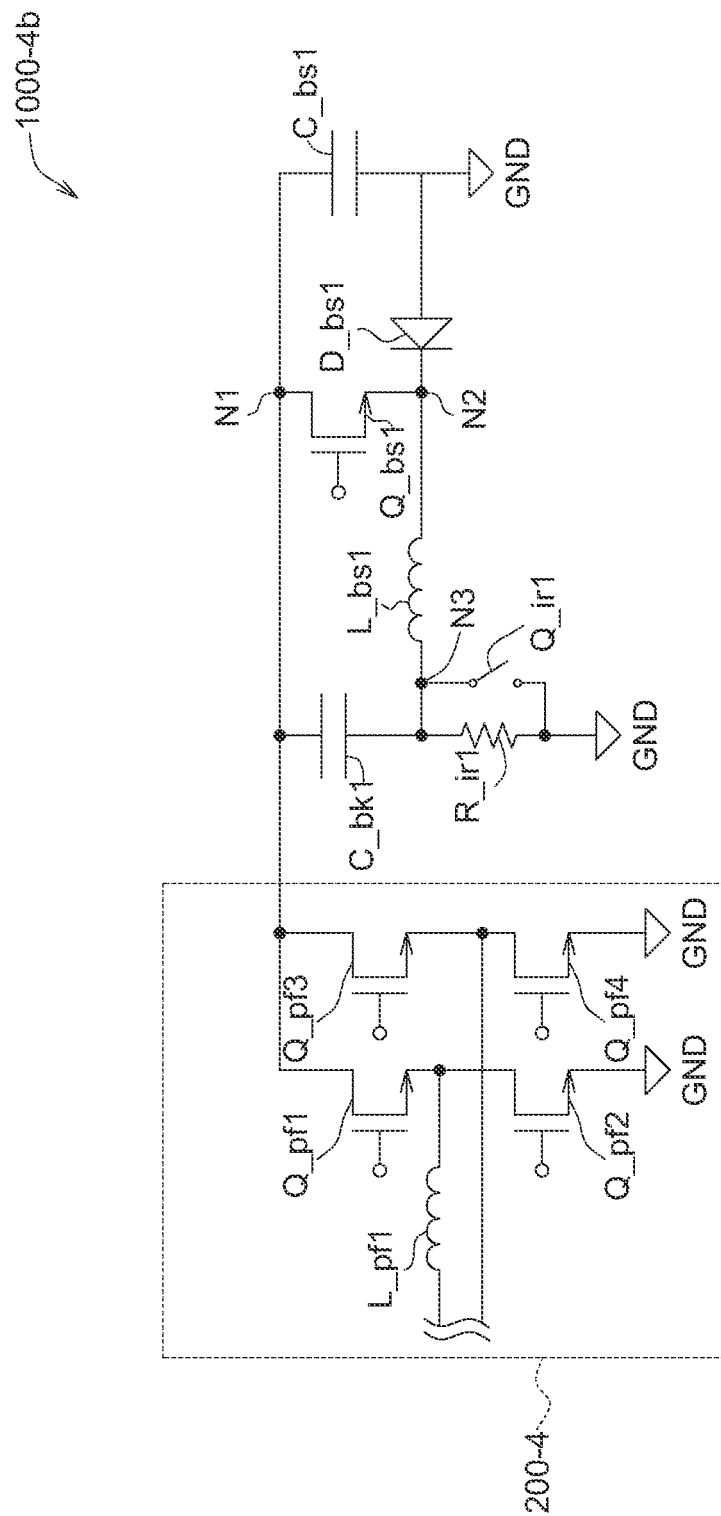

FIGS. 5A and 5B respectively are circuit diagrams of power supply circuits 1000-4a and 1000-4b according to eleventh and twelfth embodiments of the present disclosure. The embodiments of FIGS. 5A and 5B respectively are similar to the embodiments of FIGS. 4A and 4B, but are different in that the PFC circuit 200-4 of the power supply circuits 1000-4a and 1000-4b of FIGS. 5A and 5B has a different configuration. The PFC circuit 200-4 includes 4 transistors Q_pf1~Q_pf4 and an inductor L_pf1. The connection of the elements of the PFC circuit 200-4 is as follows. The source of the transistor Q_pf1 is connected to the drain of the transistor Q_pf2; the source of the transistor Q_pf3 is connected to the drain of the transistor Q_pf4. The source of the transistor Q_pf1 is connected to the inductor L_pf1. In the power supply circuit 1000-4a of FIG. 5A, the drain of the transistor Q_pf1 and the drain of the transistor Q_pf3 are connected to the capacitor C_bk1 through the resistor R_ir1. That is, the drain of the transistor Q_pf1 and the drain of the transistor Q_pf3 are indirectly connected to the capacitor C_bk1. On the other hand, in the power supply circuit 1000-4b of FIG. 5B, the drain of the transistor Q_pf1 and the drain of the transistor Q_pf3 are directly connected to the capacitor C_bk1.

Figure 6A:
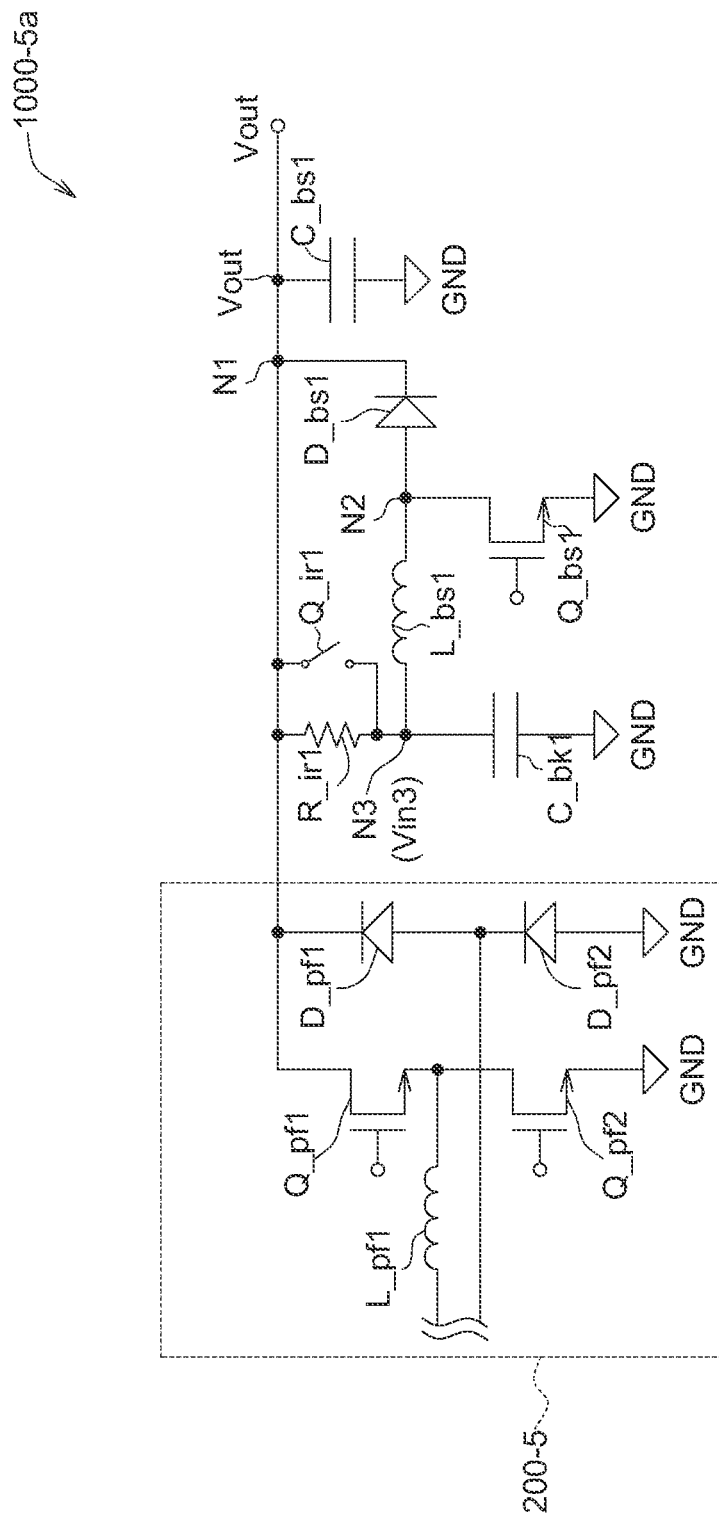
FIGS. 6A and 6B respectively are circuit diagrams of power supply circuits 1000-5a and 1000-5b according to thirteenth and fourteenth embodiments of the present disclosure.
Figure 6B:
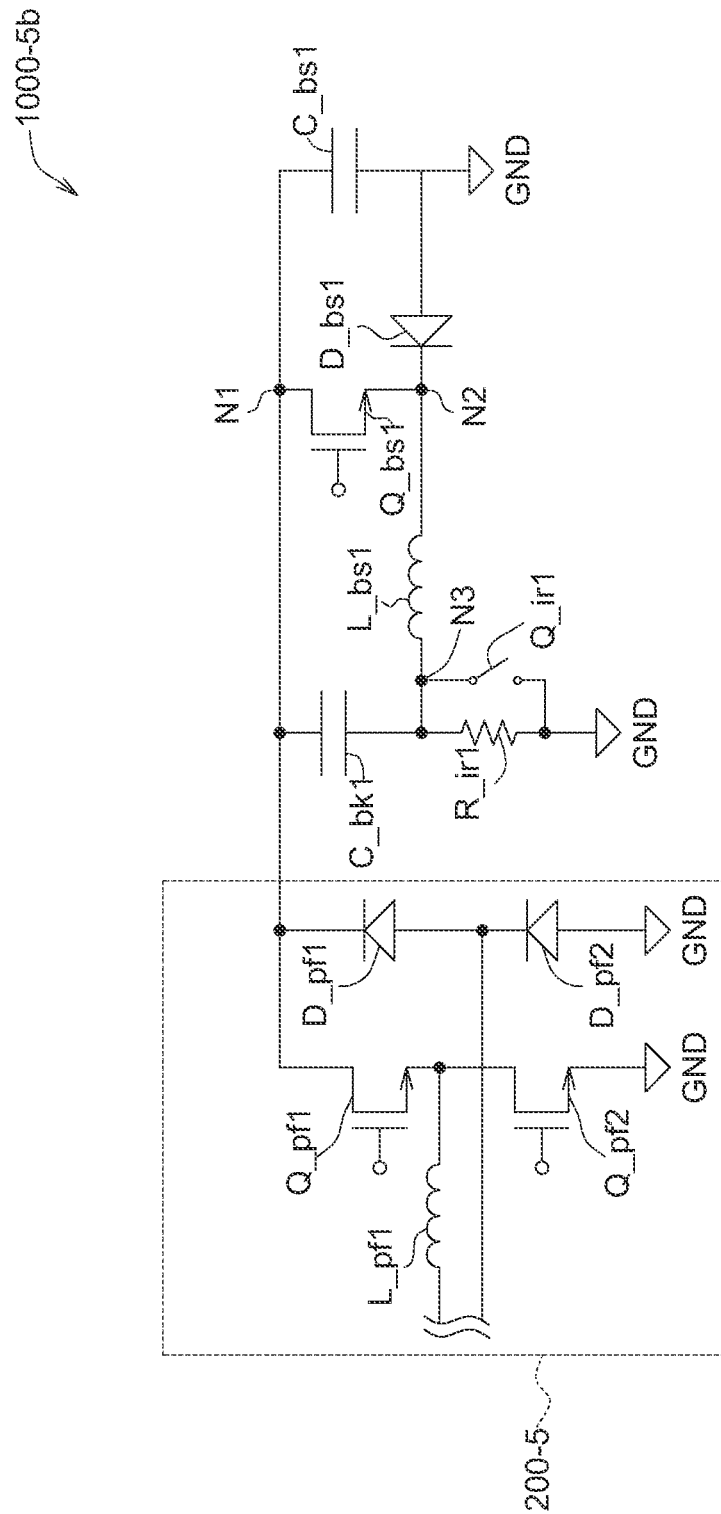

FIGS. 6A and 6B respectively are circuit diagrams of power supply circuits 1000-5a and 1000-5b according to thirteenth and fourteenth embodiments of the present disclosure. The transistors Q_pf3 and Q_pf4 of the PFC circuit 200-4 of FIGS. 5A and 5B are respectively replaced with the diodes D_pf1 and D_pf2, to form the PFC circuit 200-5 of FIGS. 6A and 6B. In the power supply circuit 1000-5a of FIG. 6A, the drain of the transistor Q_pf1 and the cathode of the diode D_pf1 are connected to the capacitor C_bk1 through the resistor R_ir1. That is, the drain of the transistor Q_pf1 and the cathode of the diode D_pf1 are indirectly connected to the capacitor C_bk1. On the other hand, in the power supply circuit 1000-5b of FIG. 6B, the drain of the transistor Q_pf1 and the cathode of the diode D_pf1 are directly connected to the capacitor C_bk1.

Figure 7A:
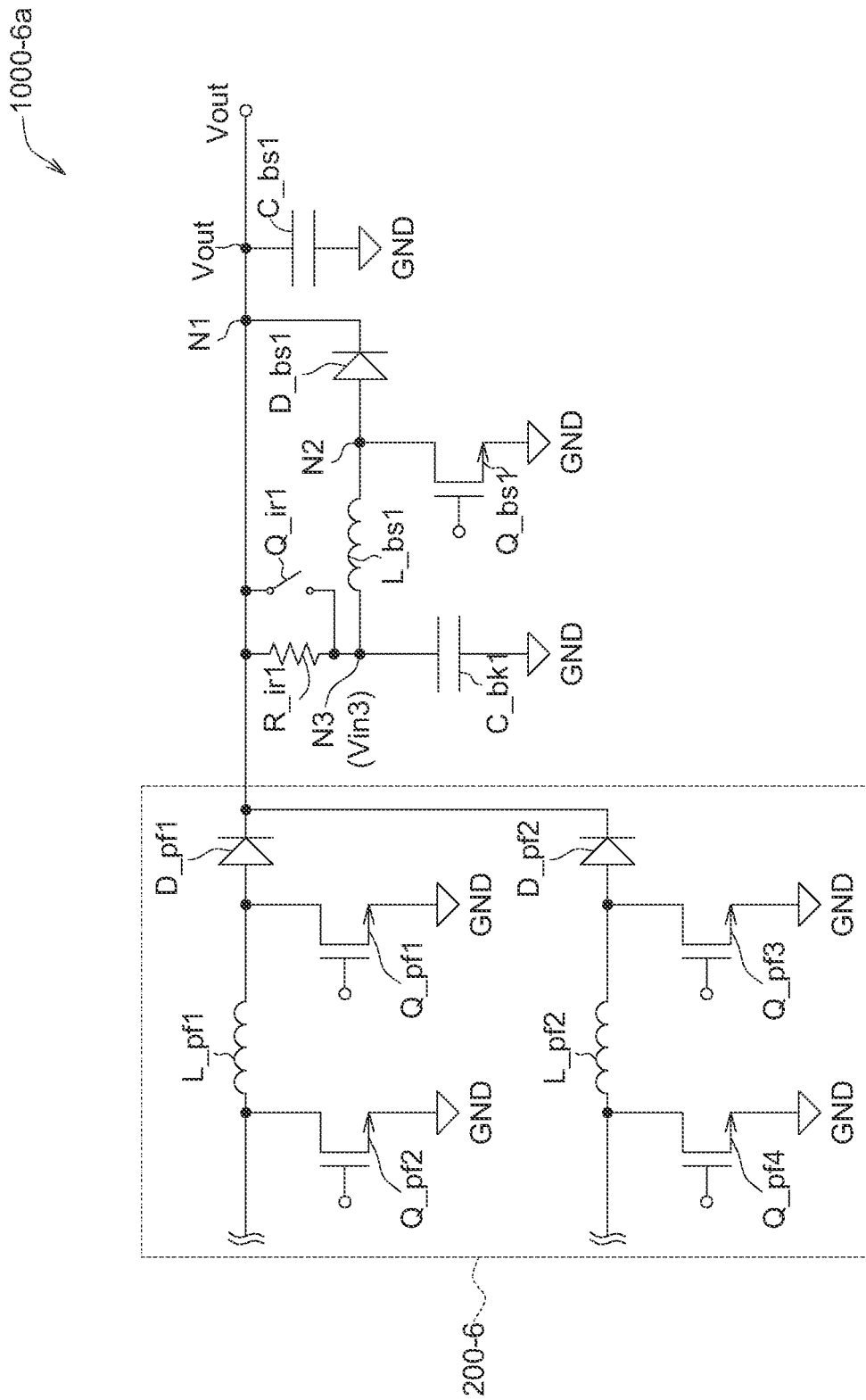
FIGS. 7A and 7B respectively are circuit diagrams of power supply circuits 1000-6a, 1000-6b according to fifteenth and sixteenth embodiments of the present disclosure.
Figure 7B:
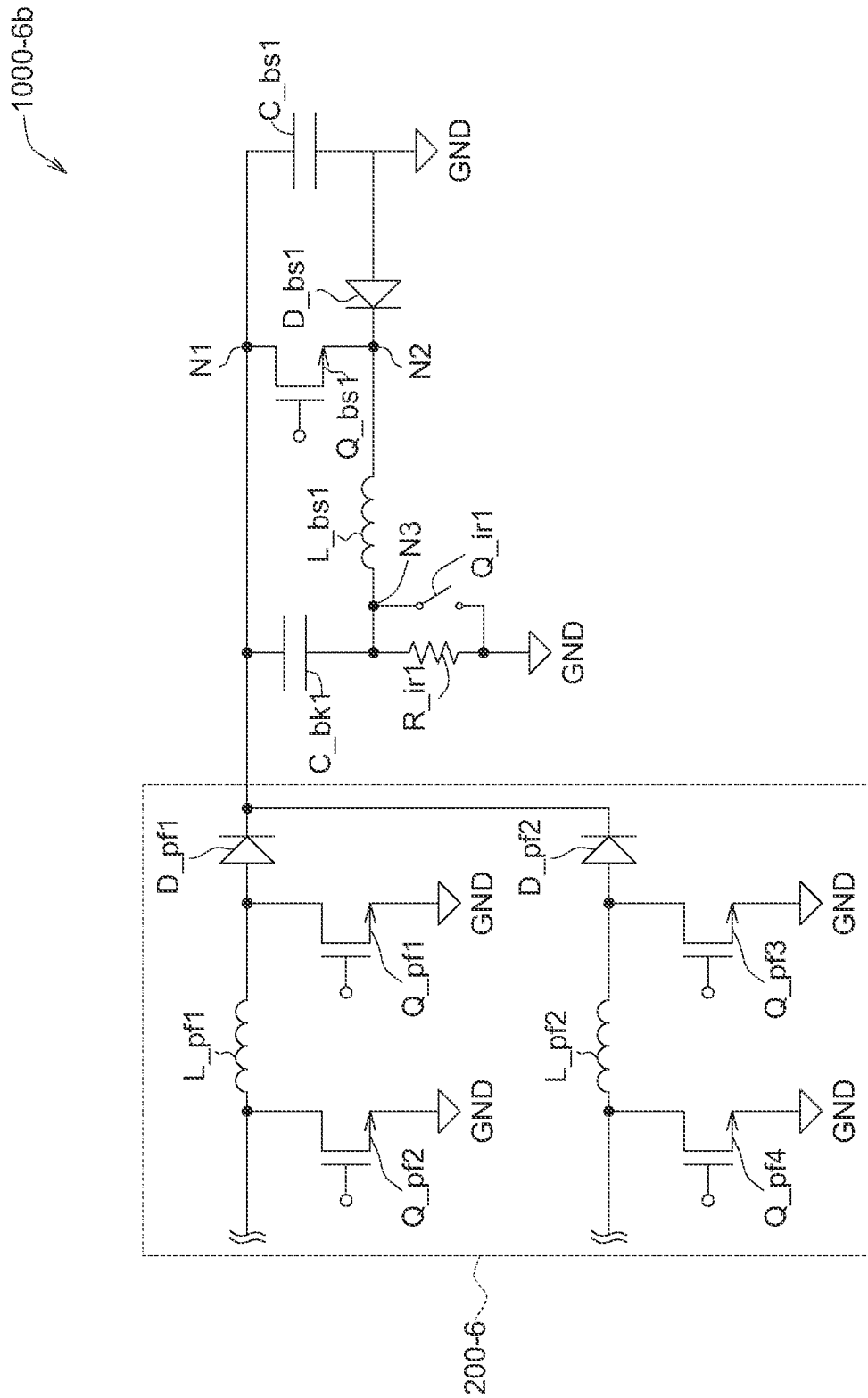

FIGS. 7A and 7B respectively are circuit diagrams of power supply circuits 1000-6a and 1000-6b according to fifteenth and sixteenth embodiments of the present disclosure. The PFC circuit 200-6 of FIGS. 7A and 7B includes 4 transistors Q_pf1~Q_pf4, 2 inductors L_pf1 and L_pf2 and 2 diodes D_pf1 and D_pf2. The connection of the elements of the PFC circuit 200-6 is as follows. In the first portion of the PFC circuit 200-6, the drain of the transistor Q_pf2 and the drain of the transistor Q_pf1 are connected to the inductor L_pf1; the drain of the transistor Q_pf1 is connected to the anode of the diode D_pf1.

Likewise, in the second portion of the PFC circuit 200-6, the drain of the transistor Q_pf4 and the drain of the transistor Q_pf3 are connected to the inductor L_pf2, and the drain of the transistor Q_pf3 is connected to the anode of the diode D_pf2.

In the power supply circuit 1000-6a of FIG. 7A, the cathode of the diode D_pf1 and the cathode of the diode D_pf2 are connected to the capacitor C_bk1 through the resistor R_ir1. That is, the cathode of the diode D_pf1 and the cathode of the diode D_pf2 are indirectly connected to the capacitor C_bk1. On the other hand, in the power supply circuit 1000-6b of FIG. 7B, the cathode of the diode D_pf1 and the cathode of the diode D_pf2 are directly connected to the capacitor C_bk1.

Figure 8:
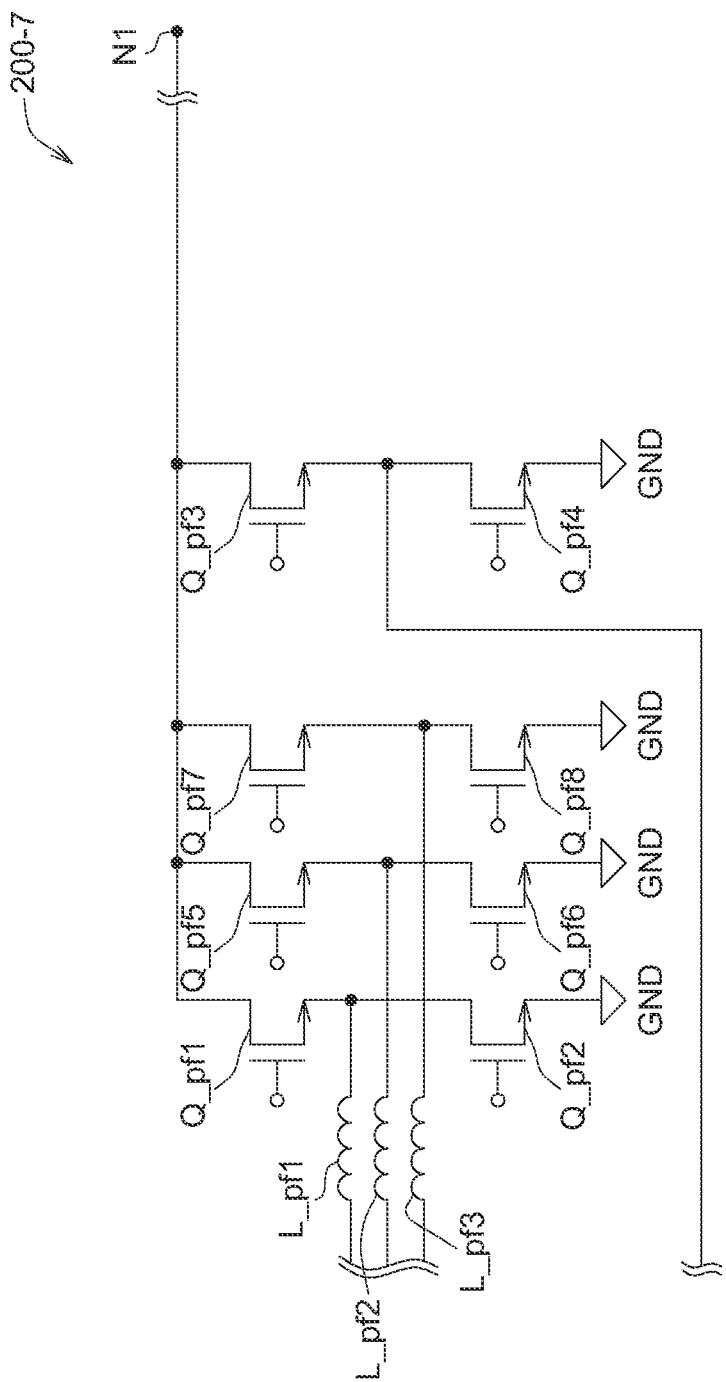
FIG. 8 is a circuit diagram of a PFC circuit 200-7 according to another embodiment of the present disclosure.

In respective embodiments of FIGS. 5A and 5B, 6A, 6B, 7A, and 7B, inrush current suppression may be performed through the soft-start control mechanism, therefore the resistor R_ir1 may be dispensed with. On the other hand, through the coupling inductance mechanism, the inductor L_bs1 is coupled to the inductor L_pf1, and the inductor L_bs1 is coupled to the inductor L_pf2, or the inductor L_pf1 is coupled to the inductor L_pf2. Moreover, the quantities and connection of the diodes, transistors or inductors of the PFC circuit may be changed to form different configurations of the PFC circuit. For instance, the configuration of 8 transistors Q_pf1~Q_pf8 and 3 inductors L_pf1~L_pf3 forms the PFC circuit 200-7 of FIG. 8. In the PFC circuit 200-7, the source of the transistor Q_pf1 is connected to the drain of the transistor Q_pf2 and is connected to the inductor L_pf1; the source of the transistor Q_pf5 is connected to the drain of the transistor Q_pf6 and is connected to the inductor L_pf2; the source of the transistor Q_pf7 is connected to the drain of the transistor Q_pf8 and is connected to the inductor L_pf3. Moreover, respective drains of the transistors Q_pf1, Q_pf5, Q_pf7 and Q_pf3 may be directly connected to the capacitor Cbk_1 or indirectly connected (through the resistor R_ir1) to the capacitor Cbk_1 (not illustrated in the diagram).

Figure 9:
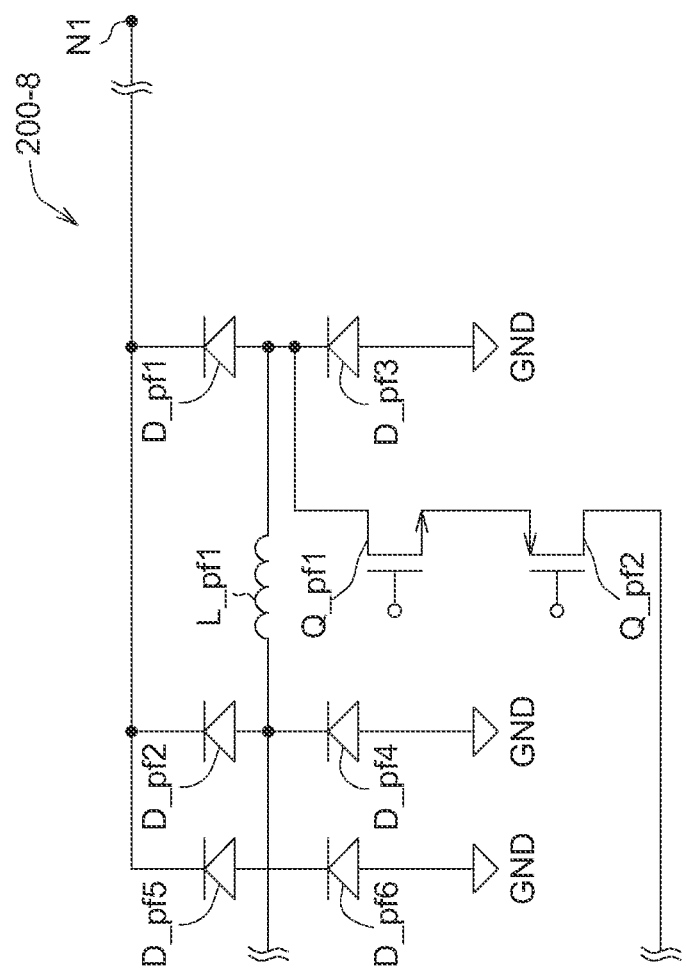
FIG. 9 is a circuit diagram of a PFC circuit 200-8 according to an alternate embodiment of the present disclosure.

Also, the configuration of 2 transistors Q_pf1, Q_pf2 and 1 inductor L_pf1 and 6 diodes D_pf1~D_pf6 forms the PFC circuit 200-8 of FIG. 9. In the PFC circuit 200-8, the anode of the diode D_pf5 is connected to the cathode of the diode D_pf6, and the anode of the diode D_pf2 is connected to the cathode of the diode D_pf4 and is connected to the inductor L_pf1. The anode of the diode D_pf1 is connected to the cathode of the diode D_pf3 and connected to the inductor L_pf1 and is connected to the drain of the transistor Q_pf1. The source of the transistor Q_pf1 is connected to the source of the transistor Q_pf2. Moreover, respective cathodes of the diode D_pf1, D_pf2 and D_pf5 may be directly connected to the capacitor Cbk_1 or indirectly connected (through the resistor R_ir1) to the capacitor Cbk_1 (not illustrated in the diagram).

Figure 10:
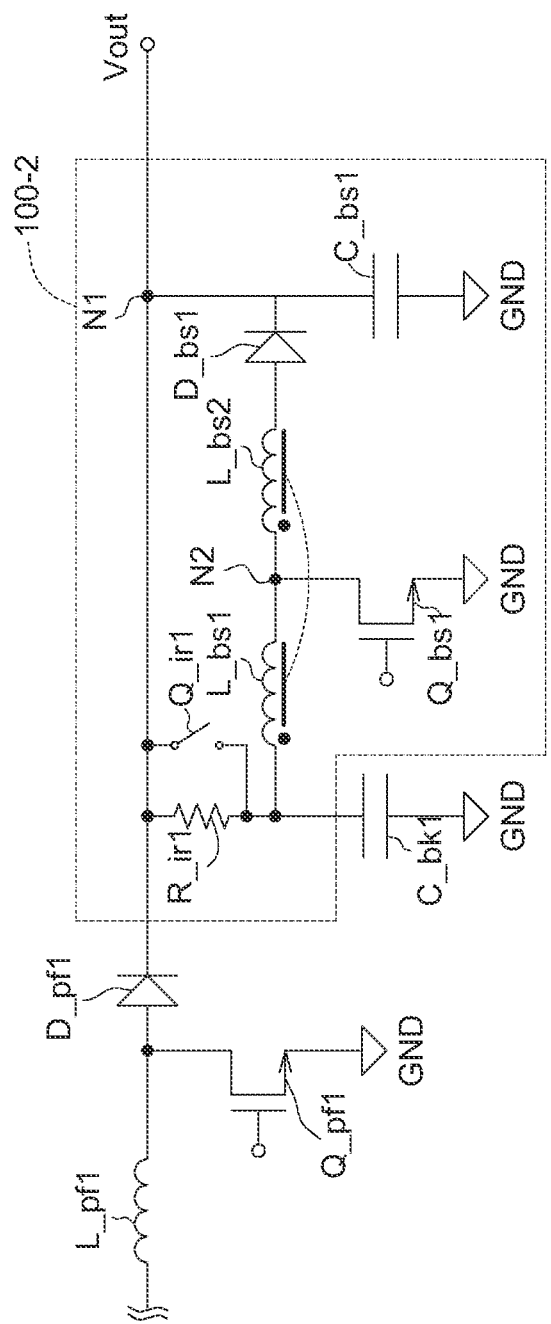
FIG. 10 is a circuit diagram of a boost conversion circuit 100-2 according to another embodiment of the present disclosure.

FIG. 10 is a circuit diagram of a boost conversion circuit 100-2 according to another embodiment of the present disclosure. The boost conversion circuit 100-2 of FIG. 10 is similar to the boost conversion circuit 100-1a of FIG. 2A, but is different in that the boost conversion circuit 100-2 further includes another inductor L_bs2. That is, the boost conversion circuit 100-2 includes 2 inductors L_bs1 and L_bs2.

The inductor L_bs1 is connected in series with the inductor L_bs2. The inductor L_bs2, the inductor L_bs1 and the drain of the transistor Q_bs1 are connected to the node N2. The inductor L_bs2 is disposed between the inductor L_bs1 and the diode D_bs1. Moreover, the inductor L_bs1 is coupled to the inductor L_bs2 through the coupling inductance mechanism, and the inductor L_bs1 and the inductor L_bs2 use the same magnetic core.

Figure 11:
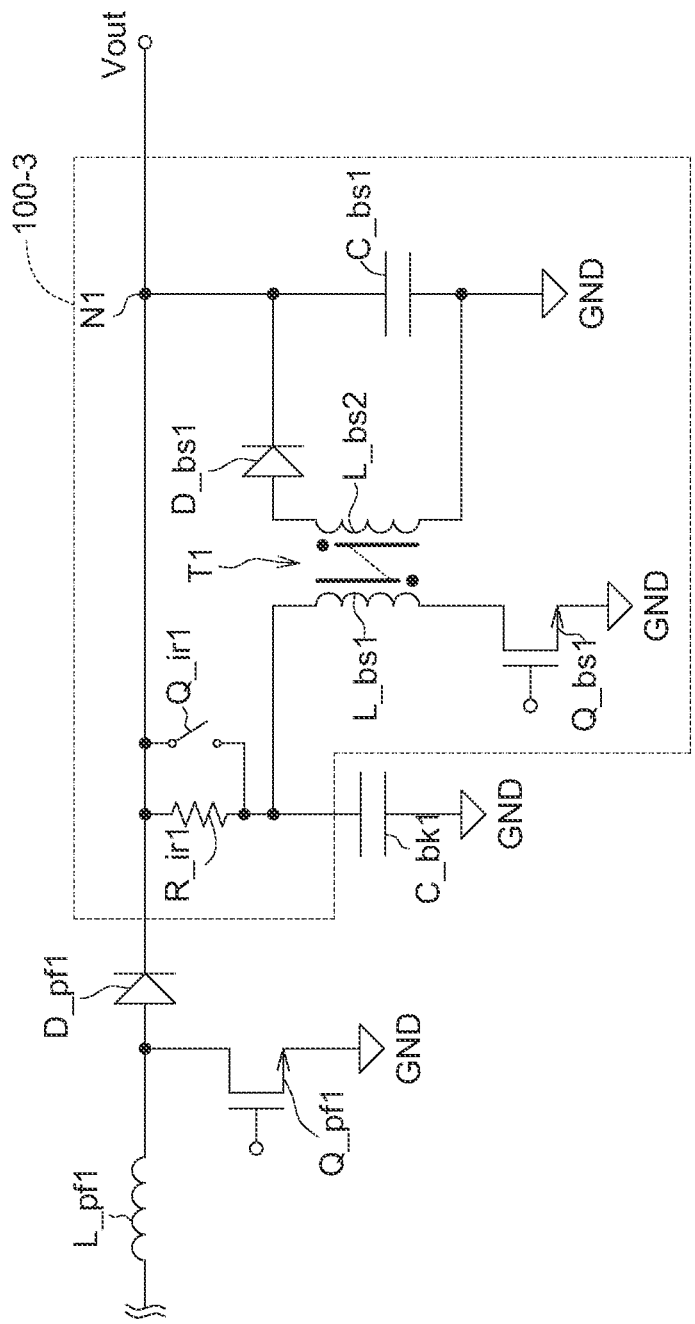
FIG. 11 is a circuit diagram of a boost conversion circuit 100-3 according to an alternate embodiment of the present disclosure.

FIG. 11 is a circuit diagram of a boost conversion circuit 100-3 according to an alternate embodiment of the present disclosure. The boost conversion circuit 100-3 of FIG. 11 is similar to the boost conversion circuit 100-2 of FIG. 10, but is different in that the inductors L_bs1 and L_bs2 of the boost conversion circuit 100-3 are configured as two side coils of the transformer. For instance, the inductor L_bs1 is configured as the first side coil of the transformer T1, the inductor L_bs2 is configured as the second side coil of the transformer T1, and the inductor L_bs1 and the inductor L_bs2 use the same magnetic core.

The connection of each element of the boost conversion circuit 100-3 is as follows. One end of the inductor L_bs2 is connected to the anode of the diode D_bs1; the other end of the inductor L_bs2 is connected to the ground end GND and the capacitor C_bs1. On the other hand, one end of the inductor L_bs1 is connected to the resistor R_ir1 and the switch Q_ir1; the other end of the inductor L_bs1 is connected to the drain of the transistor Q_bs1.

Figure 12:
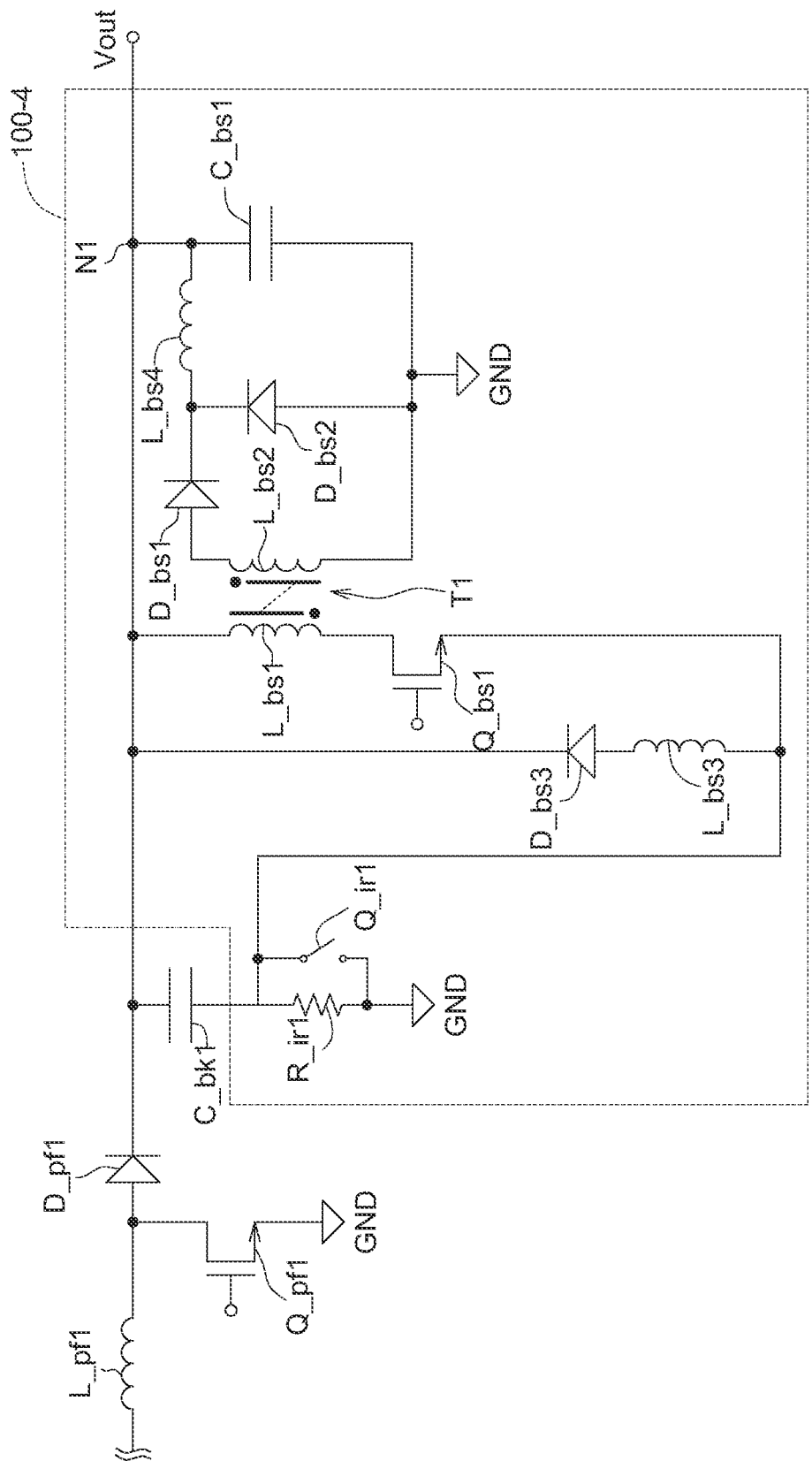
FIG. 12 is a circuit diagram of a boost conversion circuit 100-4 according to another alternate embodiment of the present disclosure.

FIG. 12 is a circuit diagram of a boost conversion circuit 100-4 according to another alternate embodiment of the present disclosure. The boost conversion circuit 100-4 of FIG. 12 is similar to the boost conversion circuit 100-3 of FIG. 11, but is different in that the boost conversion circuit 100-4 further includes diodes D_bs2 and D_bs3 and inductors L_bs3 and L_bs4.

The connection of each element of the boost conversion circuit 100-4 is as follows. The inductor L_bs1 is configured as the first side coil of the transformer T1; the inductor L_bs1 is connected to the drain of the transistor Q_bs1. The source of the transistor Q_bs1 is connected to the inductor L_bs3; the diode D_bs3 is connected in series with the inductor L_bs3. The cathode of the diode D_bs3 is connected to the capacitor C_bk1.

On the other hand, the inductor L_bs2 is configured as the second side coil of the transformer T1; the inductor L_bs2 is connected to the anode of the diode D_bs1. The cathode of the diode D_bs1 is connected to the cathode of the diode D_bs2 and the inductor L_bs4. The inductor L_bs4 is disposed between the diode D_bs1 and the capacitor C_bs1. The anode of the diode D_bs2 and the capacitor C_bs1 both are connected to the ground end GND.

Different circuit configurations of the boost conversion circuits 100-2~100-4 of FIGS. 10~12 may help to transfer the electrical energy E1 stored in the capacitor C_bk1 to be stored in the capacitor C_bs1, so that the holdup time of electrical energy of the power supply circuit may be maintained or increased.

In above embodiments, the inductors L_pf1~L_pf3 may also be referred as "front-stage inductors", the diodes D_pf1~D_pf6 may also be referred as "front-stage diodes", and the transistors Q_pf1~Q_pf8 may also be referred as "front-stage transistors". On the other hand, the inductors L_bs1~L_bs4 may also be referred as "post-stage inductors", the diodes D_bs1~D_bs3 may also be referred as "post-stage diodes", and the transistor Q_bs1 may also be referred as "post-stage transistors".

While the invention has been described by way of example and In the preferred embodiment (s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A power supply circuit, comprising:
    a power factor correction (PFC) circuit, for performing a power factor correction according to a first voltage to generate an intermediate voltage;
    a first storage capacitor having a second end connected to a ground end, wherein the first storage capacitor is directly or indirectly connected to the PFC circuit and used to store a first electrical energy, the first electrical energy being related to the intermediate voltage;
    a boost conversion circuit, connected to the PFC circuit and used to generate an output voltage according to the intermediate voltage, wherein the boost conversion circuit comprising:
        a first post-stage inductor having a first end connected to a first end of the first storage capacitor;
        a first post-stage diode having a first end selectively connected to a second end of the first post-stage inductor and having a second end connected to an output end of the PFC circuit; and
        a first post-stage transistor having a first end connected to the first post-stage inductor and connected to the first end of the first post-stage diode, and
    a second storage capacitor having a first end connected to the second end of the first post-stage diode, wherein a potential at the first end is equivalent to the output voltage, and the second storage capacitor is used to store a second electrical energy, the second electrical energy being related to the output voltage,
    wherein, the capacitance value of the second storage capacitor is less than the capacitance value of the first storage capacitor, and the first electrical energy is completely or partially transferred as the second electrical energy.

2. The power supply circuit according to claim 1, wherein the boost conversion circuit further comprising:
a first switch, connected between the output end of the PFC circuit and the first end of the first storage capacitor,
wherein, the first switch is used to suppress an inrush current generated by the PFC circuit.

3. The power supply circuit according to claim 2, wherein the boost conversion circuit further comprising:
a first resistor, connected to the first switch in parallel,
wherein, the first storage capacitor is connected to the PFC circuit through first resistor.

4. The power supply circuit according to claim 1, the PFC circuit comprising:
a first front-stage diode having a second end directly or indirectly connected to the first storage capacitor;
a first front-stage transistor having a first end connected to a first end of the first front-stage diode; and
a first front-stage inductor connected between the first end of the first front-stage diode and an input end of the PFC circuit.

* * * * *